United States Patent [19]
Moore

[11] Patent Number: 5,682,804
[45] Date of Patent: Nov. 4, 1997

[54] APPARATUS FOR TRIMMING THE NECK OF BLOW MOLDED PLASTIC BOTTLES AND METHOD

[75] Inventor: Eugene L. Moore, Florence, Ala.

[73] Assignee: Graham Engineering Corporation, York, Pa.

[21] Appl. No.: 546,183

[22] Filed: Oct. 20, 1995

[51] Int. Cl.$^6$ .................... B26D 7/02; B26D 5/08
[52] U.S. Cl. .................... 83/24; 83/681; 83/914; 264/536; 425/527; 425/806
[58] Field of Search .................... 83/946, 914, 681, 83/682, 100, 111, 54, 24; 264/536; 425/806, 527

[56] References Cited

U.S. PATENT DOCUMENTS

| | | | |
|---|---|---|---|
| 638,711 | 12/1899 | Higgins . | |
| 1,582,052 | 4/1926 | Klages . | |
| 1,941,316 | 12/1933 | Patzer | 164/47 |
| 2,060,888 | 4/1936 | Newman | 65/47 |
| 2,670,795 | 3/1954 | Griep | 164/11 |
| 2,818,924 | 1/1958 | Lang | 164/124 |
| 2,890,483 | 6/1959 | Soubier | 18/5 |
| 2,988,776 | 6/1961 | Schaich | 18/5 |
| 3,009,198 | 11/1961 | Kalman et al. | 18/5 |
| 3,025,562 | 3/1962 | Nelson | 18/5 |
| 3,032,809 | 5/1962 | Willard | 18/5 |
| 3,120,143 | 2/1964 | Kreider | 83/454 |
| 3,127,636 | 4/1964 | Heider | 18/5 |
| 3,145,243 | 8/1964 | Hagen | 264/98 |
| 3,164,646 | 1/1965 | Fischer | 264/98 |
| 3,209,401 | 10/1965 | Mehnert | 18/5 |
| 3,224,038 | 12/1965 | Budesheim | 18/5 |
| 3,268,641 | 8/1966 | King | 264/97 |
| 3,272,896 | 9/1966 | Winchester, Jr. | 264/98 |
| 3,278,665 | 10/1966 | Harrison | 264/98 |
| 3,295,347 | 1/1967 | Fuessle et al. | 72/55 |
| 3,314,106 | 4/1967 | Latrielle et al. | 18/5 |
| 3,340,569 | 9/1967 | Hagen | 18/5 |
| 3,351,981 | 11/1967 | Rupert | 18/5 |
| 3,363,282 | 1/1968 | Hagen et al. | 18/5 |
| 3,369,272 | 2/1968 | Martin, Jr. et al. | 18/5 |
| 3,391,588 | 7/1968 | Brown | 83/24 |
| 3,404,594 | 10/1968 | Dollenmayer | 83/587 |
| 3,411,387 | 11/1968 | Bailey | 83/30 |
| 3,417,428 | 12/1968 | Rupert | 18/5 |
| 3,429,211 | 2/1969 | Pelot | 82/46 |
| 3,454,690 | 7/1969 | Anderson et al. | 264/98 |

(List continued on next page.)

Primary Examiner—Rinaldi I. Rada
Assistant Examiner—Elizabeth Stanley
Attorney, Agent, or Firm—Thomas Hooker, P.C.

[57] ABSTRACT

An apparatus for trimming a ring from the neck of a blow molded plastic bottle includes a reverse punch for cutting a ring from the neck and positioning the ring on the punch shaft and a ring stripper for cutting one side of the ring on the punch shaft and stripping the ring from the shaft. The ring stripper travels transversely of the punch shaft. As the reverse punch is retracted with the cut ring on the punch shaft, the ring stripper is moved transversely across the path of the punch shaft. The ring stripper engages an edge of the cut ring and subsequently moves the cut ring away and severs one side to strip the ring from the shaft.

29 Claims, 8 Drawing Sheets

U.S. PATENT DOCUMENTS

| | | | |
|---|---|---|---|
| 3,465,931 | 9/1969 | Rupert | 225/1 |
| 3,469,076 | 9/1969 | Saslawsky | 219/383 |
| 3,470,582 | 10/1969 | Martin, Jr. | 18/5 |
| 3,487,501 | 1/1970 | Siard et al. | 18/5 |
| 3,494,520 | 2/1970 | Bewalda, Jr. et al. | 225/94 |
| 3,540,371 | 11/1970 | Rome et al. | 101/38 |
| 3,562,372 | 2/1971 | Schjeldahl et al. | 264/94 |
| 3,584,338 | 6/1971 | Fischer et al. | 18/5 |
| 3,597,793 | 8/1971 | Weiler et al. | 18/5 |
| 3,608,021 | 9/1971 | Ziegler | 264/98 |
| 3,657,406 | 4/1972 | Delebarre | 264/98 |
| 3,736,091 | 5/1973 | Reilly | 425/326 |
| 3,737,273 | 6/1973 | Conner | 425/326 |
| 3,762,263 | 10/1973 | Bocceda | 83/660 |
| 3,769,394 | 10/1973 | Latrielle | 264/98 |
| 3,772,946 | 11/1973 | Sarra | 83/914 X |
| 3,783,724 | 1/1974 | Uhlig | 83/140 |
| 3,791,245 | 2/1974 | Eggert | 83/370 |
| 3,796,531 | 3/1974 | Bowers | 425/387 |
| 3,806,300 | 4/1974 | Hafele et al. | 425/387 |
| 3,821,344 | 6/1974 | Peters | 264/94 |
| 3,868,773 | 3/1975 | Province | 30/130 |
| 3,869,237 | 3/1975 | Hellmer et al. | 425/292 |
| 3,910,144 | 10/1975 | Hess | 83/946 X |
| 3,971,275 | 7/1976 | Mach | 83/140 |
| 3,977,585 | 8/1976 | Sagorski | 225/101 |
| 3,989,786 | 11/1976 | Mehnert et al. | 264/98 |
| 4,037,501 | 7/1977 | Gladow | 83/100 |
| 4,060,366 | 11/1977 | Johansson | 425/290 |
| 4,122,141 | 10/1978 | Krall et al. | 264/89 |
| 4,126,658 | 11/1978 | Rupert et al. | 264/89 |
| 4,173,447 | 11/1979 | Bradbury | 425/526 |
| 4,198,886 | 4/1980 | Bowers et al. | 83/914 X |
| 4,225,303 | 9/1980 | Crisci | 425/525 |
| 4,382,469 | 5/1983 | Bell et al. | 166/248 |
| 4,390,338 | 6/1983 | Bowers et al. | 425/525 |
| 4,397,629 | 8/1983 | Akutsu et al. | 425/525 |
| 4,445,406 | 5/1984 | Thatcher | 82/46 |
| 4,463,637 | 8/1984 | Delio et al. | 83/914 X |
| 4,503,738 | 3/1985 | Morgan | 83/146 |
| 4,545,953 | 10/1985 | Cage et al. | 264/533 |
| 4,578,028 | 3/1986 | Dirksing et al. | 425/525 |
| 4,876,930 | 10/1989 | Thatcher | 82/46 |
| 4,954,071 | 9/1990 | Austin | 425/532 |
| 5,050,787 | 9/1991 | Greene | 83/914 X |
| 5,167,968 | 12/1992 | Dunlap et al. | 425/302.1 |
| 5,188,249 | 2/1993 | Cargile | 215/31 |
| 5,202,135 | 4/1993 | Yawn | 425/527 |
| 5,256,055 | 10/1993 | Morris | 425/527 |
| 5,257,560 | 11/1993 | Palazzolo | 82/46 |
| 5,346,659 | 9/1994 | Buhler et al. | 264/68 |

APPARATUS FOR TRIMMING THE NECK OF BLOW MOLDED PLASTIC BOTTLES AND METHOD

FIELD OF THE INVENTION

The invention relates to an apparatus and method for trimming a plastic ring from the neck of a blow molded plastic bottle to provide a smooth circular sealing surface for engaging complementary bevel ring of a linerless cap threaded onto the bottle neck.

DESCRIPTION OF THE PRIOR ART

Thin-walled plastic bottles, such as bottles filled with milk, juice, and other liquids, are blow molded with a cylindrical neck, a spiral thread on the neck and a blow dome above the neck. The blow dome is connected to the neck by a radially inwardly extending circumferential groove.

During initial trimming of the blow molded bottle, the blow dome is cut away from the top of the neck at the groove leaving a circumferential flange extending inwardly a short distance from the neck to an inner edge. A pair of opposed V-recesses are formed in the inner flange edge at the parison pinch lines.

Blow molded plastic bottles of the type described are preferably closed by a linerless cap. The cap includes an interior bevel ring which extends into the opening inside the neck flange when the cap is threaded onto the neck. The bevel ring is wedged against interior edge or seal surface of the flange to form a seal closing the bottle. While a linerless cap forms a tight seal against circular portions of the inner edge of the flange, the cap does not seal the two V-recesses extending outwardly from the seal surface at the parison pinch lines.

It is possible to seal a bottle with a neck flange having V-recesses using a cap with a resilient liner in the bottom of the cap so that threading of the cap on the neck compresses the liner against the flange to form the desired seal. However, use of a lined cap undesirably increases the cost of the bottle.

The inner surfaces of plastic bottle neck flanges are conventionally trimmed to remove the V-recesses and form smooth circular seal surfaces permitting use of inexpensive linerless caps. Conventional bottle trimming machines remove the V-recesses by reaming the inner flange surfaces. A rotary reamer is extended into the neck flange and cuts away a circumferential portion of the interior of the neck flange including the V-recesses to form a smooth circular seal surface.

Reaming of the neck flange generates plastic chips in the bottle. These chips must be completely removed from the bottle prior to filling. Removal of chips from the bottle is difficult, and, in the case of a bottle with a handle, nearly impossible.

In addition to providing a smooth seal surface on the neck flange by reaming, it is also conventional to blow mold plastic bottles using a special mold which includes a cylindrical tool positioned below the neck portion of the mold during molding. The tool is withdrawn outwardly of the neck immediately after blow molding of the bottle to form a smooth cylindrical surface on the interior of the neck suitable for sealing using a linerless cap. Blow molding bottles using this method requires specialized and expensive tooling for each mold. The method is not well adapted for use on high speed multi-mold rotary blow molding machines of the type conventionally used for blow molding thin wall plastic bottles advantageously closed by linerless caps.

SUMMARY OF THE INVENTION

The neck trimming apparatus according to the invention cuts a one piece plastic ring from the flange at the top of a neck in a blow molded bottle using a reverse punch without forming chips. The cut-away ring includes the V-recesses.

Reverse punching removes the ring from the top of the bottle but leaves the ring in an anvil bore surrounding the punch shaft. The ring is removed from the bore and punch shaft by a specialized ring stripper without forming chips. The stripper extends through a slot in the punch end of the shaft and is movable transversely of the punch shaft to grip a leading portion of the ring, shift the portion transversely, and then sever a trailing portion of the ring to permit the severed ring to be pulled around the shaft and out of the anvil bore in one piece for discharge. The neck of the bottle is in this way trimmed for closing using a linerless cap by removing a single ring of plastic and discharging the ring away from the bottle. The clean cutting and discharge of the ring assures that no cut plastic collects in the bottle.

Other objects and features of the invention will become apparent as the description proceeds, especially when taken in conjunction with the accompanying drawings illustrating the invention, of which there are eight sheets and one embodiment.

DESCRIPTION OF THE PREFERRED EMBODIMENTS

FIGS. 1 through 8 of the drawings illustrate a bottle neck trimming apparatus 40 for trimming a thin ring from the interior circumference of a flange located at the top of plastic bottle 10. The bottle 10 is preferably formed by blow molding and has relatively thin walls approximately 0.025 inches thick. FIGS. 9–12 illustrate the top of the bottle 10 including a cylindrical neck 12 having an exterior thread 14 wrapped around the neck 12. When ejected from the blow molding machine, bottle 10 includes a blow dome 16 joined to the top of the neck 12 at a circular groove 18 extending around the neck 12. During initial trimming of the bottle 10, the blow dome 16 is severed from the neck 12 at the lower wall of the groove 18 so that the bottom of the groove 18 forms a circumferential flange 20 extending inwardly from the top of neck 12. A pair of 180 degree-opposed V-recesses 22 are formed on the inner edge 24 of flange 20. The V-recesses 22 are the consequence of blow molding a bottle 10 having a neck 12 with a diameter less than the diameter of the parison from which the bottle 10 is blow molded. The neck trimming apparatus 40 disclosed herein trims away narrow rings of plastic from the inner edge 24 of flange 20 along circular trim line 26 located radially outwardly of the V-recess to form a new completely circular inner edge on the flange 20 suitable for forming a tight seal with linerless cap 28.

Figure 12:
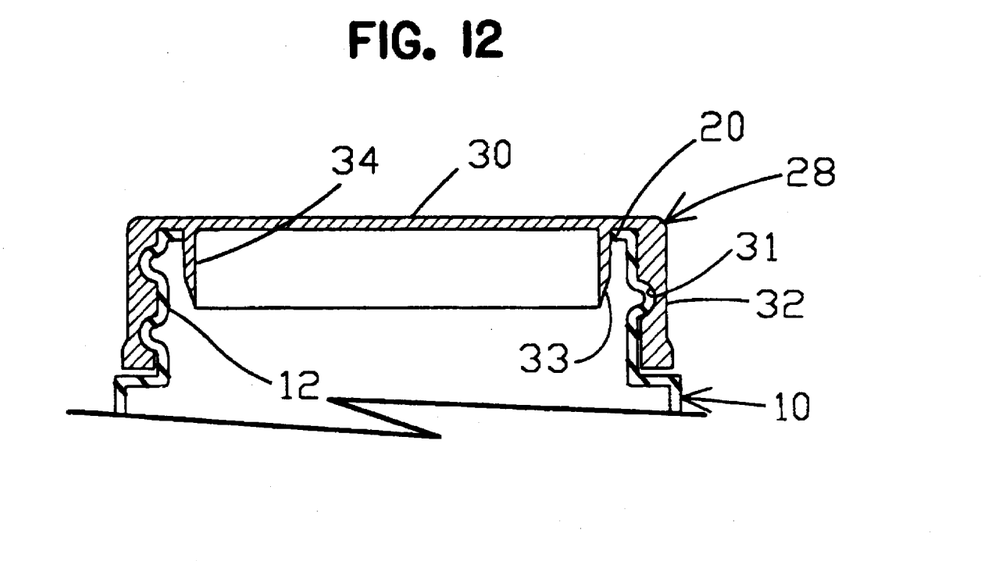
FIG. 12 is a sectional view showing a linerless cap threaded on the neck of the bottle.

Linerless cap 28 includes a circular top 30, a cylindrical side 32 joined to the top 30, an interior spiral thread groove 31 engagable with bottle thread 14 and a circular bevel ring 34 having an outwardly facing bevel surface 33 engaging the inner edge of bottle flange 20 to form a tight seal between the bottle 10 and cap 28. The cap 28 is threaded on neck 12 of a trimmed bottle 10 as shown in FIG. 12. Bevel ring 34 tightly seals against the trimmed inner edge 24 of flange 20.

Referring now to FIGS. 1–8, trimming apparatus 40 includes a pair of neck clamp jaws 42 and a suitable drive, not illustrated, operable to open and close the jaws 42 so that the neck 12 of bottle 10 is confined between the jaws 42 with the top surfaces 57 of the jaws 42 flush with the top of the bottle neck 12 and flange 20.

Neck trimming apparatus 40 includes a punch assembly 44 having a body 46 with a punch shaft 48 extending vertically through punch body bore 50 formed in the body 46. Reverse punch 52 is mounted on the lower end 49 of shaft 48. Shaft drive 54, which may be a power cylinder or other suitable type of drive, is mounted on the upper end 51 of the punch shaft 48 and is operable to extend and retract the reverse punch 52 between the retracted position shown in FIG. 1 and the extended position shown in FIG. 3.

The reverse punch 52 is symmetrical around the longitudinal axis of the punch shaft 48 and includes a circular, small diameter lead end 58, a circular, large diameter trailing end 60, a sharp circular cutting edge 62 at trailing end 60 and an inwardly tapered or frustoconical portion 64 between ends 58 and 60. Anvil bore 66 in body 46 surrounds the lower end of punch shaft 48 and has a diameter slightly larger than the maximum diameter of reverse punch 52. The reverse punch 52 has a close, sliding fit in the anvil bore 66 when retracted.

Figure 1:
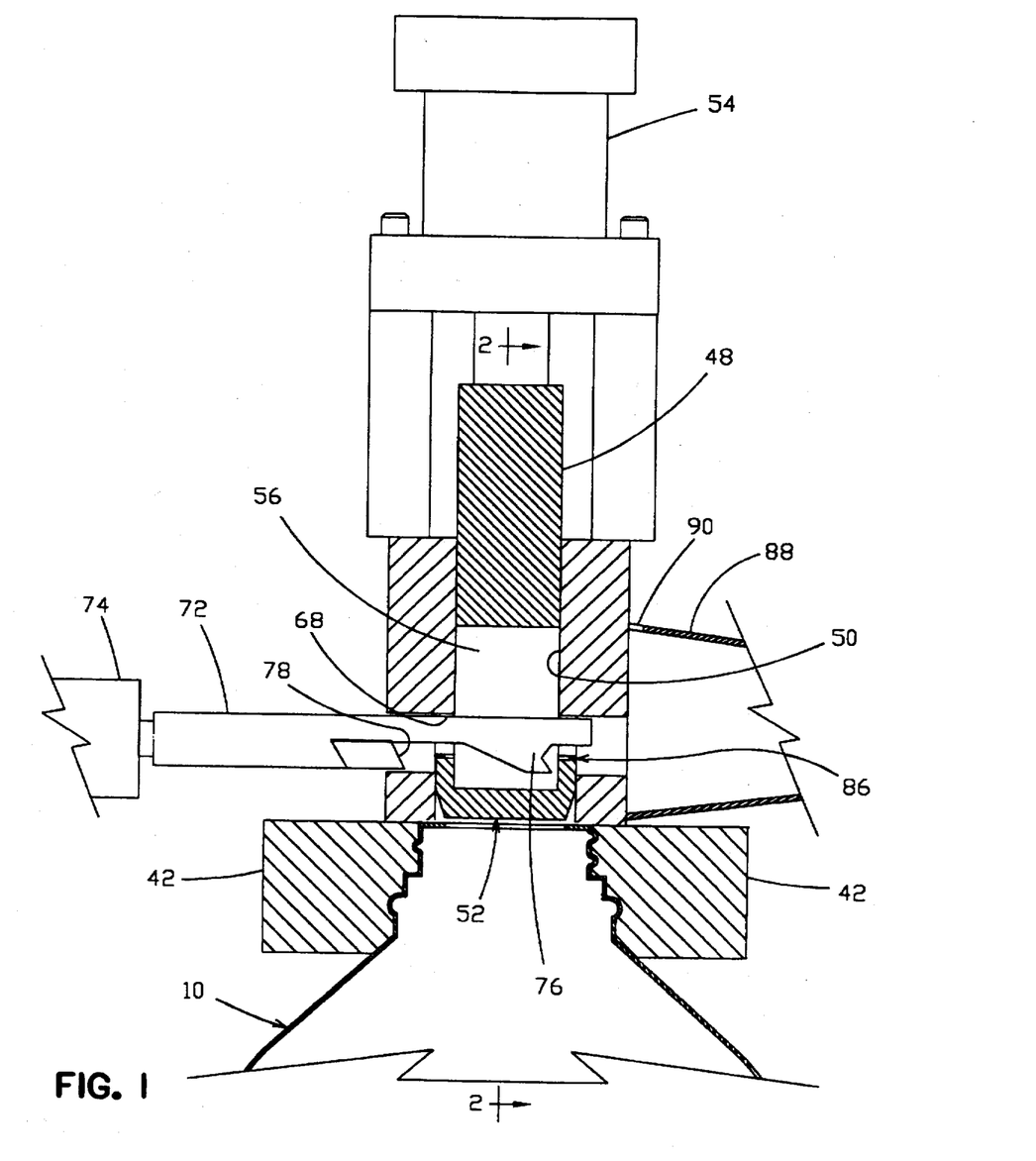
FIG. 1 is a partial vertical sectional view taken through the neck trimming apparatus.
Figure 2:
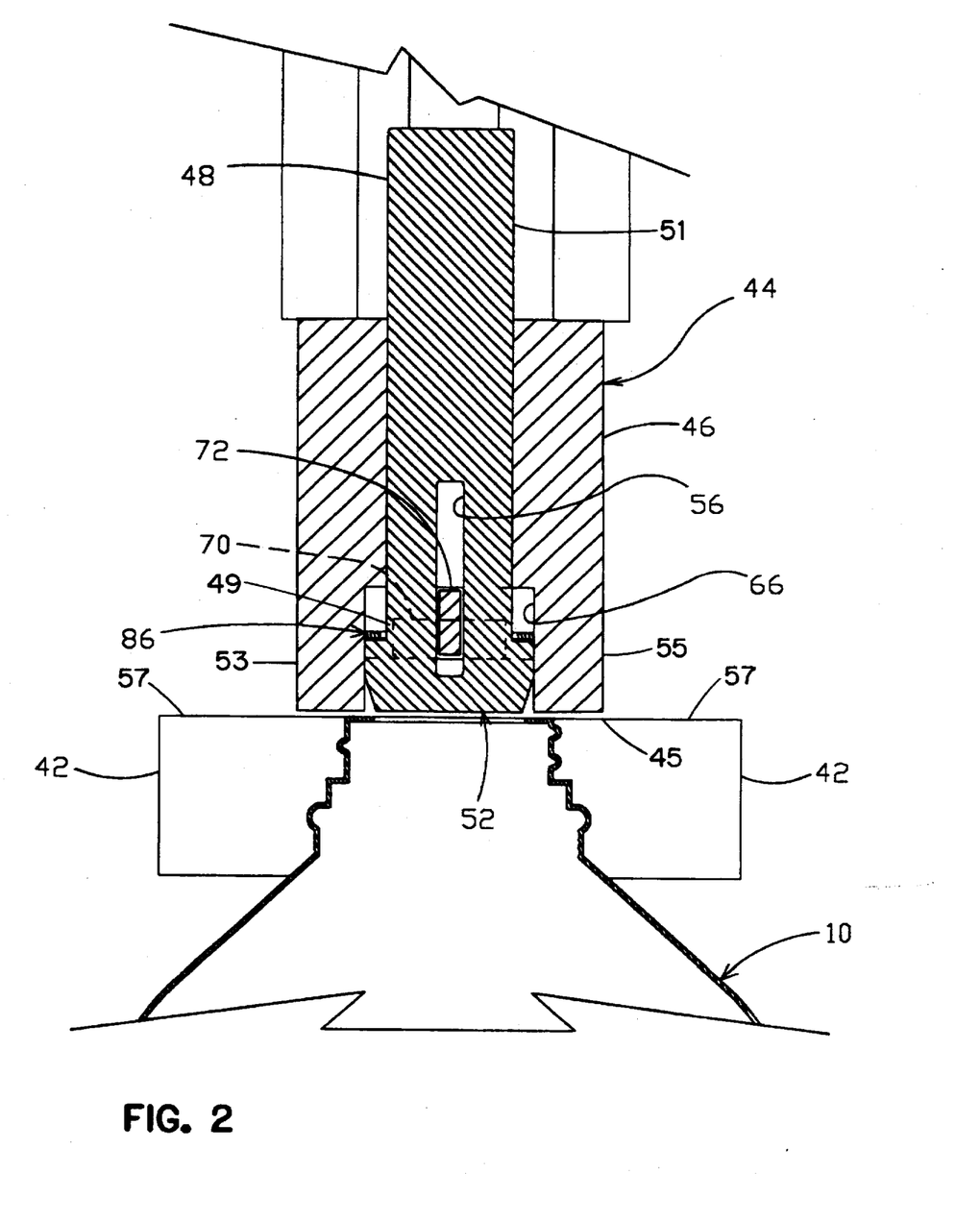
FIG. 2 is a sectional view taken along line 2—2 of FIG. 1.

As illustrated in FIG. 1, rectangular stripper passage 68 extends from the left side 53 of body 46 as shown in FIG. 2 to anvil bore 66. An enlarged discharge passage 70 extends from the right side 55 of body 46 as shown in FIG. 2 to the anvil bore 66. Narrow bar groove 71 is located at the top 73 of discharge passage 70. Elongate ring stripper slide bar 72 has a sliding fit in stripper passage 68 and extends to the left of body 46 to a stripper drive 74 which reciprocates the stripper slide bar 72 back and forth in passage 68 between the retracted position shown in FIG. 1 and the extended position shown in FIG. 7. Stripper drive 74 may be a power cylinder or other suitable drive. The ring stripper slide bar 72 includes a ring mover or hook 76 adjacent lead end 80, and an angled cutting blade 78 spaced a distance inwardly from hook 76. Recess 82 is provided at the bottom of the ring stripper slide bar 72 or the ring stripper member 72 between the hook and cutter blade 78.

When stripper drive 74 is retracted ring stripper slide bar 72 lead end 80 is located at the side of the anvil bore 66 adjacent discharge passage 70 and extends a short distance into the groove 71 as a pilot. Bar portion 84 extends between the hook 76 and blade 78 and above recess 82 and is located at the opposite side of the anvil bore 66 adjacent stripper passage 68. The lead end 80 and portion 84 form ring stops to prevent possible movement of severed rings 86 up in anvil bore 66 above the hook 76 and blade 78.

A vacuum manifold 88 is connected to body 46, surrounds the discharge passage 70 and groove 71 and extends from body 46 to a receptacle for collecting rings cut from bottle necks by reverse punch 52 and a vacuum source. The receptacle and vacuum source are not illustrated. Air inlet port 90 permits air to flow through the manifold to the vacuum source.

The operation of neck trimming apparatus 40 will now be described.

In the start position as illustrated in FIG. 1, the neck of bottle 10 is held between neck clamp jaws 42 which are flush on the bottom surface 45 of body 46 with the bottle neck 12 held in coaxial alignment with the axis of the punch shaft 48. Drives 54 and 74 are retracted as shown with punch 52 located in the anvil bore 66 and the ring stripper bar 72 retracted. A plastic ring 86 punched from the previous bottle 10 is held in bore 66 by friction at a level adjacent hook 76 and blade 78. Hook 76 is located in the lower end of punch shaft slot 56 below punch end 60. Cutter blade 78 located in the stripper passage 68 on the side of the punch shaft away from the discharge passage 70. Slot 56 in punch shaft 48 extends into the reverse punch 52 a distance sufficient to permit the hook to extend freely into the punch when the punch 52 is retracted.

Figure 3:
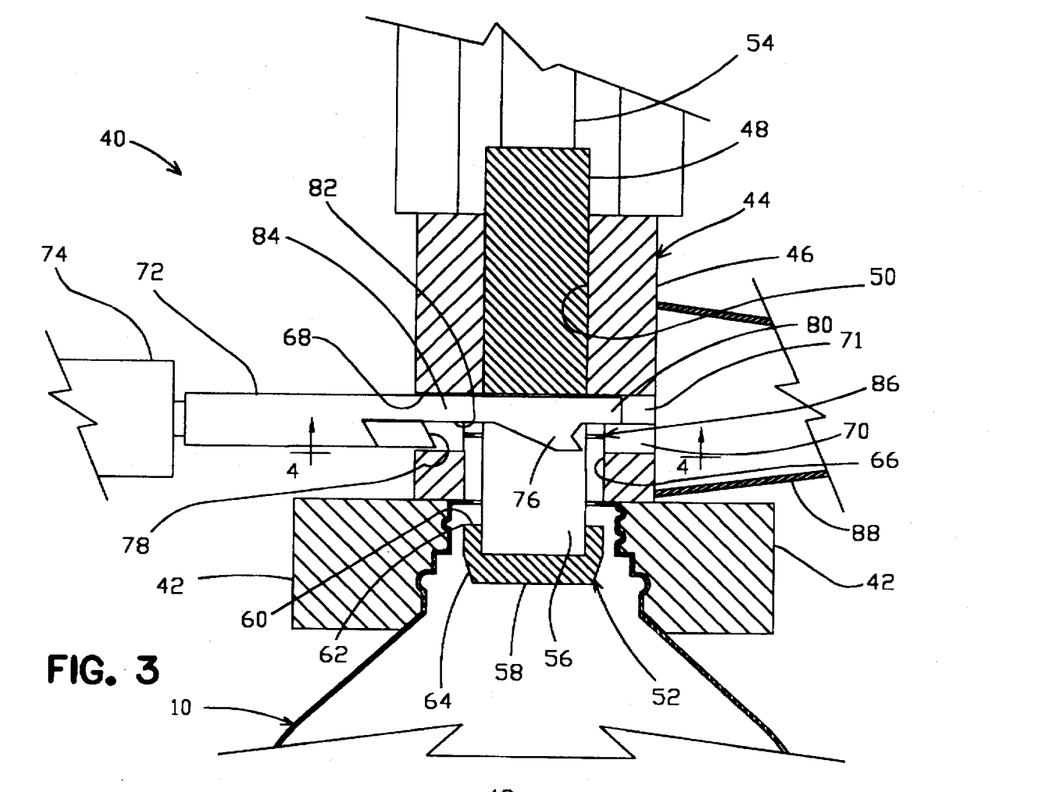
FIG. 3 is a view similar to FIG. 1 illustrating extension of the reverse punch.
Figure 4:
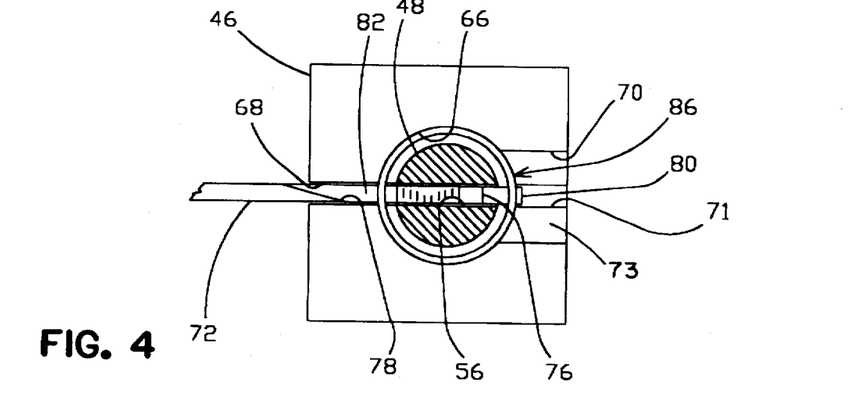
FIG. 4 is a sectional view taken along line 4—4 of FIG. 3.
Figure 5:
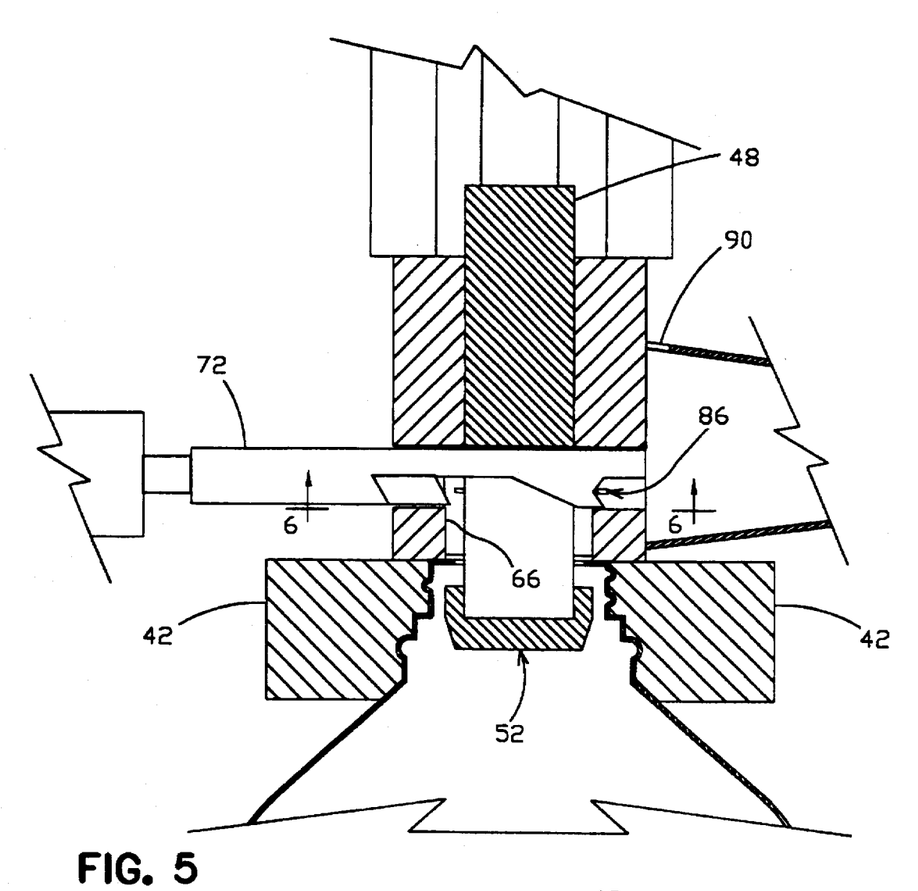
FIGS. 5 and 6 are views similar to FIGS. 3 and 4 illustrating stripping away of a cut ring.
Figure 6:
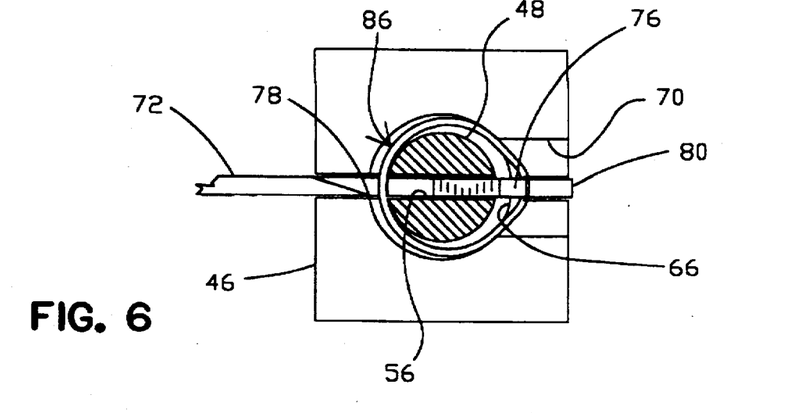
Figure 7:
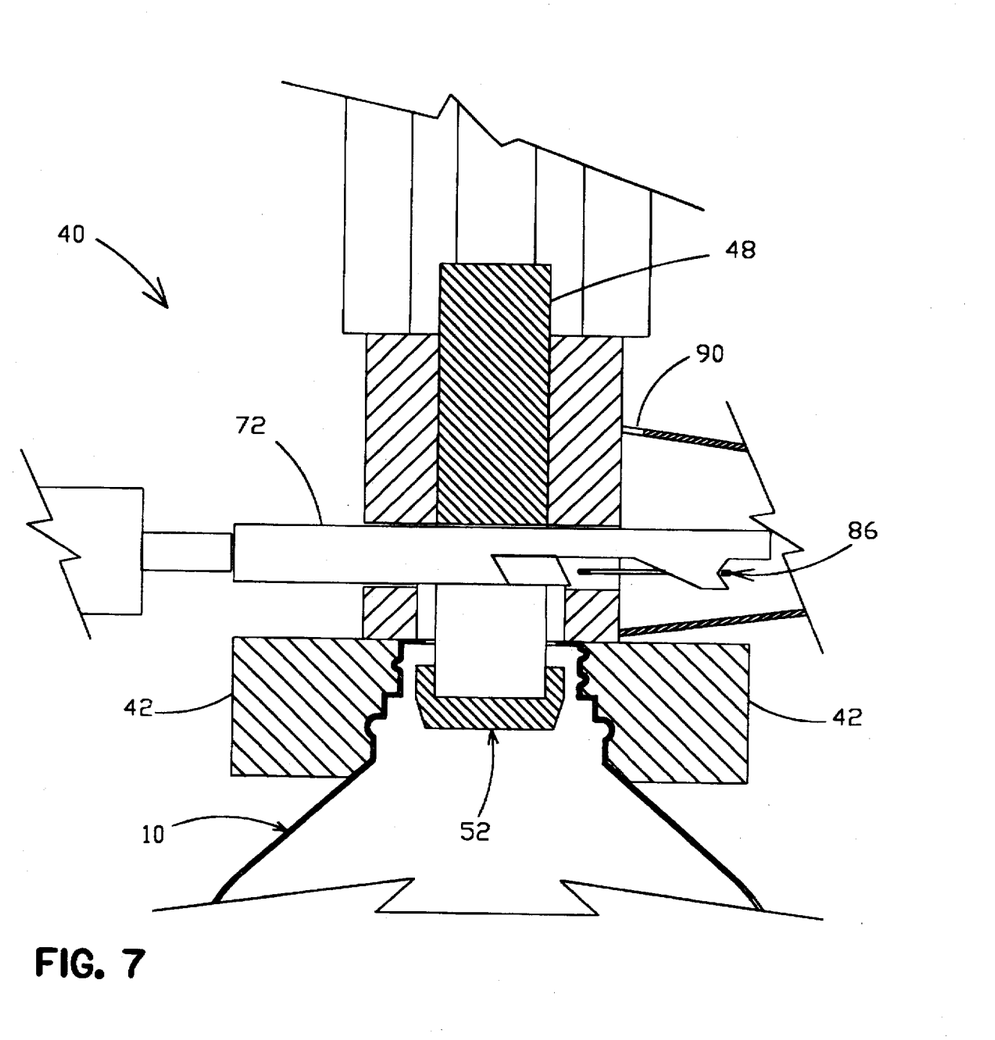
FIGS. 7 and 8 are similar to FIG. 1 further illustrating stripping away of the ring.
Figure 8:
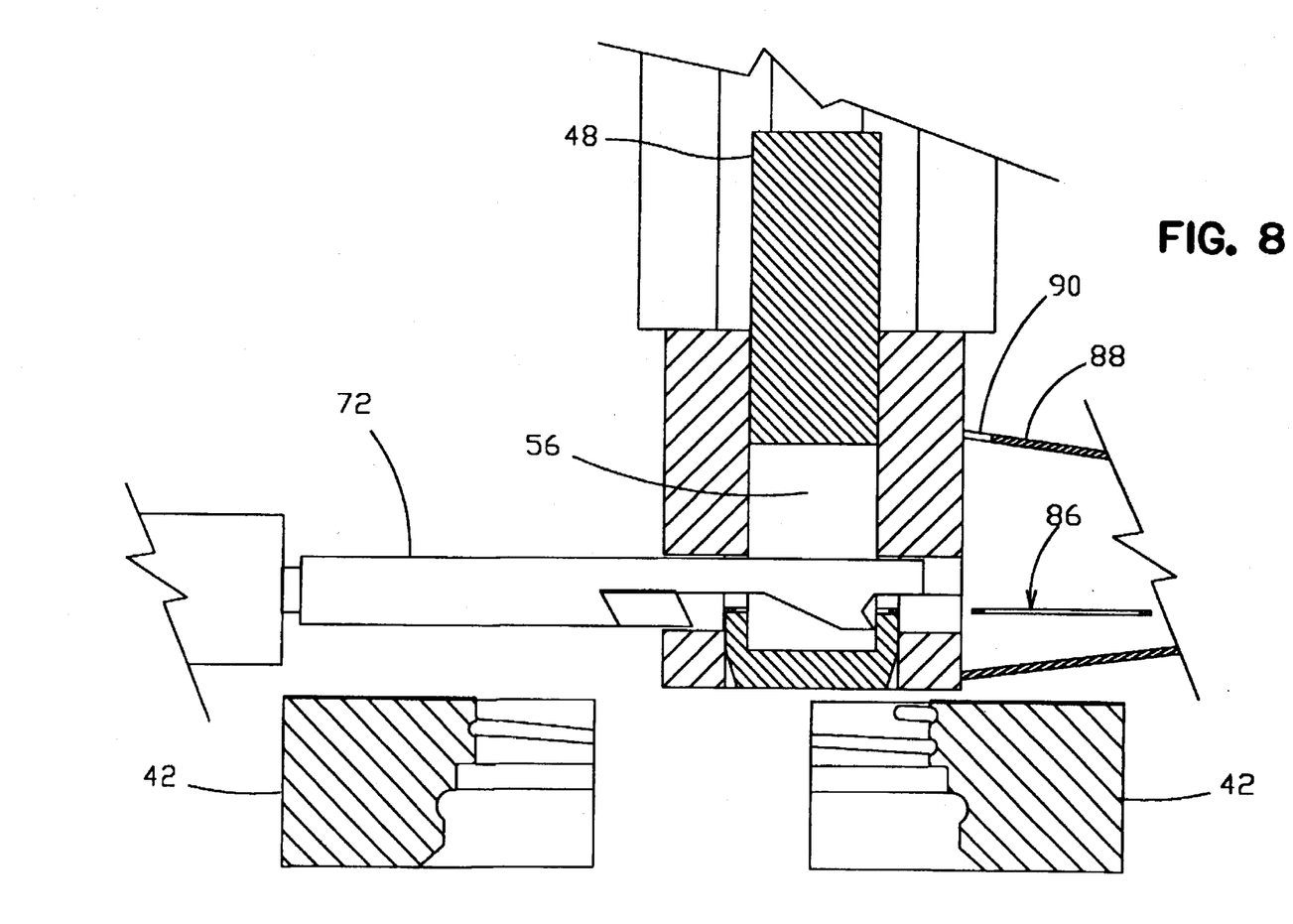
Figure 9:
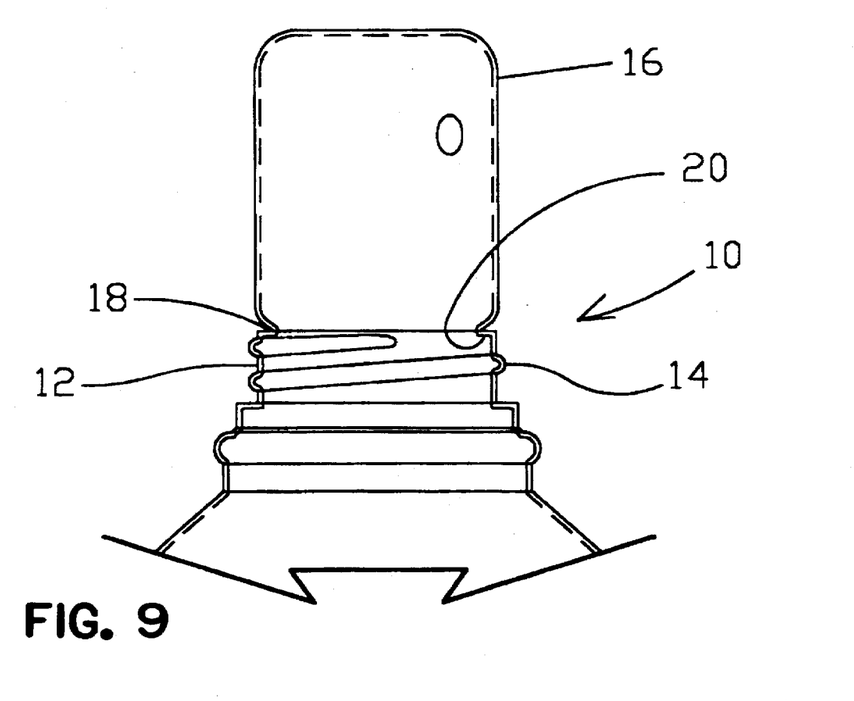
FIG. 9 is a side view of the top of a blow molded bottle.
Figure 10:
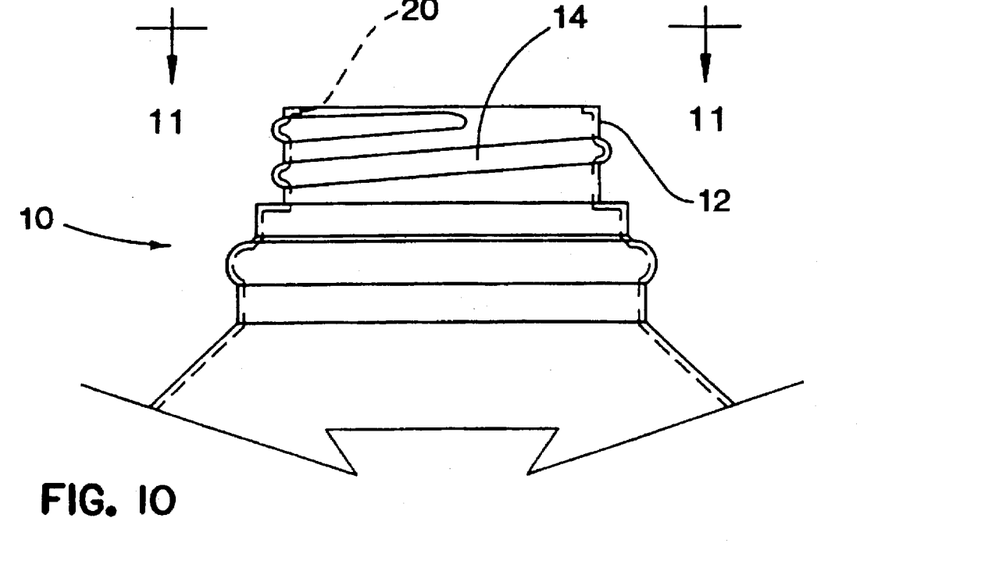
FIG. 10 is a side view of the bottle after trimming away of the blow dome.
Figure 11:
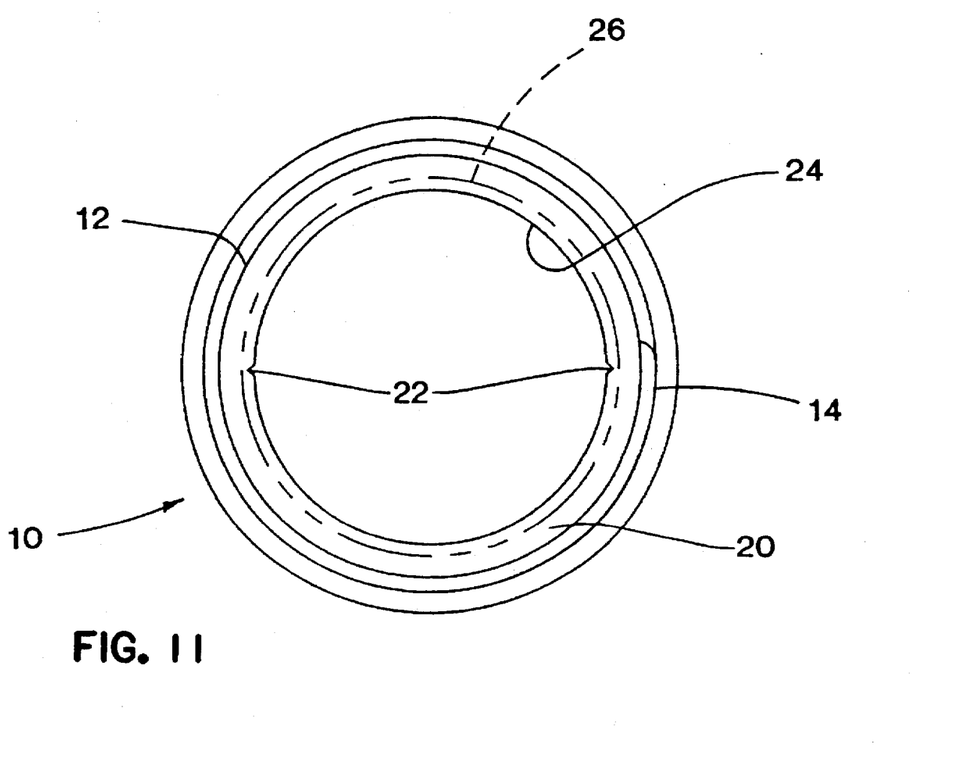
FIG. 11 is a view taken along line 11—11 of FIG. 10.

Punch drive 54 is then actuated to extend the reverse punch 52 through the opening in the top of the bottle neck. During extension, the circumferential flange 20 is flexed downwardly and outwardly by the frustoconical portion 64 of the punch. After the punch is extended past the flange, the flange returns to its original position as shown in FIG. 3.

After the reverse punch 52 has been extended into the neck 12 of the next bottle 10, stripper drive 74 is extended to move ring stripper bar 72 from the retracted position to the extended position. Extension of the ring stripper 72 first moves hook 76 into engagement with the lead portion of ring 86 punched from the prior bottle to move the portion of the ring outwardly from the anvil bore 66 and into the discharge passage 70. This movement of the lead portion of the ring pulls the trailing portion of the ring 86 away from the opposite side of the anvil bore 66 and against the punch shaft 48 at slot 56. See FIG. 6. Further extension of drive 74 stretches and holds the ring 86 taught against the punch shaft 48 and moves blade 78 against the taut ring to sever the trailing portion of the ring at slot 56. Blade 78 is angled so that the blade lead end is below the ring and the cutting edge slopes away from the lead end to assure that the blade captures and severs the trailing portion of the ring.

Further extension of the stripper drive 74 moves the one-piece severed ring past the punch shaft 48, out of the anvil bore 66 and discharge passage 70 and into the vacuum manifold 88. The vacuum source draws air into the manifold and away from the punch assembly so that when the severed ring falls free from hook 76, it is drawn along the manifold and is captured in a waste receptacle.

Following stripping of ring 86 from the punch shaft 48, drive 74 is retracted to return the ring stripper bar 72 to the position of FIG. 1. Shaft drive 54 is then reversed to retract the punch 52 into the anvil bore 66 and cut a narrow, one piece plastic ring 86 from the inner edge of flange 20 along trim line 26 illustrated in FIG. 11. The trailing end 60 of the punch 52 is moved into the anvil bore 66 above the bottom of the stripper passage 68 and discharge passage 70 and past hook 76 as shown in FIGS. 1 and 2 to position ring 86 in the anvil bore 66 in position to be cut and ejected.

After the reverse punch 52 has been fully retracted into bore 66 to cut ring 86 from the neck flange and position the ring in bore 66 for ejection, the neck clamp jaws 42 are opened to release bottle 10, a new bottle is positioned between the jaws and the jaws are closed on the neck of the bottle. If desired, punch assembly 44 may be moved away from the neck jaws or the jaws may be moved away from the assembly by a suitable drive during release of the trimmed bottle and pick up of the next bottle. The shaft drive 54 is then extended to move the reverse punch through the neck of the second bottle and initiate the next cycle of operation.

The drawings illustrate the apparatus 10 oriented in a vertical position with the punch shaft extending vertically and the bottle 10 held in a vertical position below the punch shaft. Alternatively, the apparatus may be oriented in a horizontal position with the punch shaft extending horizontally and the neck of bottle 10 held in a horizontal position.

While I have illustrated and described a preferred embodiment of my invention, it is understood that this is capable of modification, and I therefore do not wish to be limited to the precise details set forth, but desire to avail myself such changes and alterations as fall within the purview of the following claims.

What I claim as my invention is:

1. An apparatus for trimming a ring from a neck of a blow molded plastic bottle, the apparatus comprising: a body; a shaft bore in the body; an anvil bore at an end of the shaft bore; a punch shaft in the shaft bore, said punch shaft having an end adjacent the anvil bore, and a slot extending across said end of the punch shaft; a reverse punch on said end of the punch shaft, said reverse punch having a close fit in the anvil bore; a ring stripper member mounted in the slot, the ring stripper member including a blade and a ring hook; a stripper drive joined to the ring stripper member, the stripper drive moving the ring stripper member between a retracted position where the blade is located outwardly of the slot and the ring hook is located in the slot, and an extended position where the blade is located in the slot and the ring hook is located outwardly of the slot.

2. An apparatus as in claim 1 including a recess in the ring stripper member between the cutter blade and the ring hook.

3. An apparatus as in claim 2 wherein said slot extends into the reverse punch.

4. An apparatus as in claim 1 including a stripper passage in the body and wherein a portion of the ring stripper member is located in the stripper passage and extends outwardly of the body, and said stripper drive is joined to said portion.

5. An apparatus as in claim 4 wherein said portion and said stripper drive are located adjacent the stripper passage.

6. An apparatus as in claim 5 wherein the stripper passage is straight and said stripper drive reciprocates the ring stripper member back and forth in the stripper passage.

7. An apparatus as in claim 1 including a stripper passage in the body communicating with the anvil bore in alignment with the slot, said ring stripper member mounted in the stripper passage and including an end located outwardly of the passage, said end joined to said stripper drive.

8. An apparatus as in claim 7 including an outlet discharge passage in the body, a vacuum manifold surrounding the outlet discharge passage, a vacuum source connected to the manifold remote from the body, and an air inlet port adjacent the outlet discharge passage.

9. An apparatus as in claim 7 including a discharge passage in the body communicating with the anvil bore away from the stripper passage.

10. An apparatus as in claim 9 wherein said discharge passage is larger than the ring hook.

11. An apparatus as in claim 1 wherein the slot extends a distance along a length of the punch shaft greater than a dimension of the ring stripper member along the length of the punch shaft.

12. An apparatus as in claim 1 wherein the ring hook and blade are located adjacent to the reverse punch.

13. An apparatus as in claim 12 wherein said slot extends into the reverse punch.

14. An apparatus for trimming a ring from a neck of a blow molded plastic bottle, the apparatus comprising: a body, a shaft bore in the body, an anvil bore at an end of the shaft bore, a punch shaft in the shaft bore, the punch shaft having an end adjacent the anvil bore, an opening in the end of the punch shaft, a reverse punch on the end of the punch shaft, said reverse punch having a close fit in the anvil bore, a cutter blade; a cutter blade drive joined to the cutter blade, in which the cutter blade drive moves the cutter blade between a retracted position away from the opening and an extended position in the opening.

15. An apparatus as in claim 14 including a ring mover.

16. An apparatus as in claim 15 including a first passage in the body communicating with the anvil bore in alignment with the opening, and a ring discharge passage in the body communicating with the anvil bore away from the first passage.

17. An apparatus as in claim 16 wherein said opening comprises a slot extending through the punch shaft, said ring discharge passage is in alignment with the slot and including a slide bar slidably mounted in the first passage, said slide bar including said cutter blade and said ring mover.

18. An apparatus as in claim 17 including a recess between the cutter blade and the ring mover.

19. An apparatus as in claim 18 wherein said ring mover comprises a hook.

20. An apparatus as in claim 19 wherein said cutter blade drive is joined to said slide bar outside of said body.

21. An apparatus as in claim 17 wherein said slot extends a distance into said reverse punch.

22. An apparatus as in claim 21 wherein said first passage is straight and said cutter blade drive reciprocates the slide bar back and forth in the first passage.

23. An apparatus as in claim 22 including a vacuum manifold surrounding an outlet passage, a vacuum source connected to the manifold remote from the body, and an air inlet part adjacent the outlet passage.

24. A method of trimming a neck of a plastic blow molded bottle having V-recesses using a reverse punch mounted on a punch shaft, the method including the steps of:
a) extending the reverse punch into the neck of a blow molded plastic bottle;
b) retracting the reverse punch from out of the neck of the bottle to cut a ring of plastic including the V-recesses from the neck of the bottle in a single piece and position the trimmed ring on the punch shaft free from the bottle;
c) moving a cutter blade toward the punch shaft to engage and cut a first portion of the ring while retaining the ring in a single piece; and
d) engaging a second portion of the ring away from the first portion and moving such second portion away from the punch shaft to strip the ring from the punch shaft in a single piece.

25. The method of claim 24 including the step of:
e) extending the reverse punch, retracting the reverse punch and moving the cutter blade without forming plastic chips.

26. The method of claim 24 including the step of:
f) by moving the cutter blade into an opening in the punch shaft.

27. The method of claim 24 including the step of:
g) moving the cutter blade and the second portion of the ring in a direction generally transverse to the punch shaft.

28. The method of claim 27 including the steps of:
i) positioning a ring mover in the punch shaft; and
j) extending the ring mover out of the punch shaft to engage the second portion of the ring and strip the ring from the shaft.

29. The method of claim 28 including the step of:
k) moving the cutter blade into the punch shaft during cutting of the first portion of the ring.

* * * * *

UNITED STATES PATENT AND TRADEMARK OFFICE
CERTIFICATE OF CORRECTION

PATENT NO. : 5,682,804
DATED : November 4, 1997
INVENTOR(S) : Eugene L. Moore

It is certified that error appears in the above-identified patent and that said Letters Patent is hereby corrected as shown below:

Claim 26, line 2, delete "by".

Signed and Sealed this

Thirteenth Day of January, 1998

Attest:

BRUCE LEHMAN

Attesting Officer     Commissioner of Patents and Trademarks